United States Patent [19]

Evans et al.

[11] Patent Number: 5,585,077
[45] Date of Patent: Dec. 17, 1996

[54] MOLYBDENUM EPOXIDATION CATALYST RECOVERY

[75] Inventors: Thomas I. Evans, Glenmoore; Stephen H. Harris, Kennett Square, both of Pa.

[73] Assignee: ARCO Chemical Technology, L.P., Greenville, Del.

[21] Appl. No.: 510,727

[22] Filed: Aug. 3, 1995

[51] Int. Cl.$^6$ ................................................ C01G 39/00
[52] U.S. Cl. ........................................ 423/58; 423/59
[58] Field of Search .......................... 423/58, 53, 59

[56] References Cited

U.S. PATENT DOCUMENTS

| | | | |
|---|---|---|---|
| 3,351,635 | 11/1967 | Kollar | 260/348.5 |
| 3,567,433 | 3/1971 | Gutnikov | 423/53 |
| 3,763,303 | 10/1973 | Khuri et al. | 423/54 |
| 3,819,663 | 6/1974 | Levine et al. | 423/53 |
| 4,405,572 | 9/1983 | Moore et al. | 423/54 |
| 4,455,283 | 6/1984 | Sweed | 423/53 |
| 4,485,074 | 11/1984 | Poenisch | 423/53 |
| 4,547,345 | 10/1985 | Sebenik et al. | 423/53 |
| 5,171,868 | 12/1992 | Albal et al. | 549/529 |
| 5,276,235 | 1/1994 | Dubner | 549/529 |

FOREIGN PATENT DOCUMENTS

| | | | |
|---|---|---|---|
| 458253 | 7/1949 | Canada | 423/58 |
| 57-022119 | 2/1982 | Japan | 423/53 |

*Primary Examiner*—Steven Bos
*Attorney, Agent, or Firm*—William C. Long

[57] ABSTRACT

An aqueous epoxidation process stream containing molybdenum and sodium values and organics is treated for organics removal as by incineration and an aqueous solution containing molybdenum and sodium is recovered, acidified and reacted with a calcium compound to form solid $CaMoO_4$ which is separated.

5 Claims, 1 Drawing Sheet

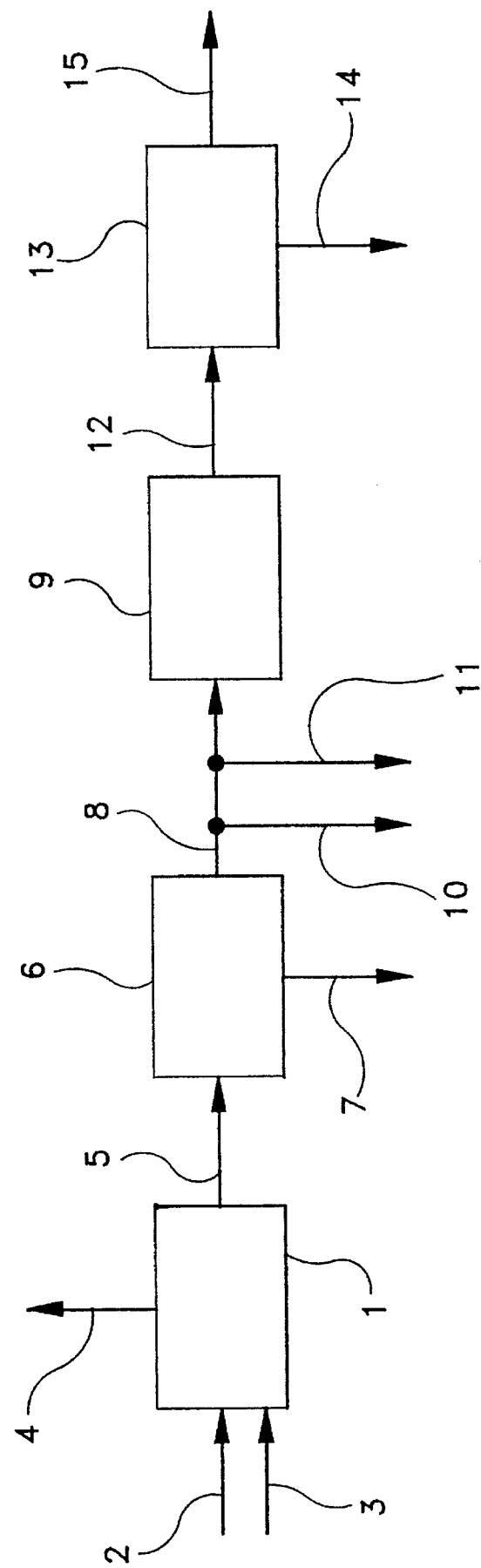

MOLYBDENUM EPOXIDATION CATALYST RECOVERY

BACKGROUND OF THE INVENTION

1. Field of the Invention

The production of oxirane compounds such as propylene oxide by the catalytic reaction of an olefin with an organic hydroperoxide is a process of great commercial importance. Generally a homogeneous molybdenum catalyst is employed. The Oxirane Process for the co-production of propylene oxide and styrene monomer is illustrative of this technology.

The process of the instant invention relates to the separation of molybdenum epoxidation catalyst values in such epoxidation process technology.

2. Description of Related Art

An extremely successful process for the co-production of propylene oxide and styrene monomer involves the molecular oxygen oxidation of ethyl benzene to form ethyl benzene hydroperoxide, the catalytic reaction of the hydroperoxide with propylene to form propylene oxide and 1-phenyl ethanol, and the dehydration of the 1-phenyl ethanol to styrene monomer. The basic patent describing this process is U.S. Pat. No. 3,351,635.

In practice of the process, the epoxidation reaction mixture, usually after separation of unreacted propylene by distillation, is treated with aqueous caustic in an amount in excess of that necessary both to react with contained molybdenum values to from sodium molybdate and to react with organic impurities such as acids and phenols which are also contained in the epoxidate. See U.S. Pat. Nos. 4,405,572, 5,276,235, and 5,171,868, for example.

A problem which has existed in such prior practices has been the formation of relatively large quantities of an aqueous process stream containing molybdenum, sodium and organics, and the disposal of such aqueous process streams. The presence of molybdenum is particularly troublesome since this material must be removed prior to outfall to satisfy environmental restrictions.

BRIEF DESCRIPTION OF THE INVENTION

In accordance with the present invention, the aqueous process stream containing molybdenum and sodium values as well as organics is treated, as by incineration, to first separate organics. During the incineration process, particulate ash comprised of the molybdenum and sodium values, passes downwardly through the incinerator with the incinerator gases. The ash-containing gases are quenched by admixing with water to form the incinerator blowdown. The blowdown is an aqueous solution of the molybdenum value, as sodium molybdate, and sodium value, as sodium carbonates, from the epoxidation process stream. The blowdown solution may not be directly discharged due to environmental hazards associated with the molybdenum heavy metal contained therein. In accordance with the present invention, the aqueous blowdown stream is acidified, as with HCl, so that carbonates are converted to $CO_2$ which can readily be removed. Thereafter, the essentially carbonate-free stream is treated at carefully controlled conditions in accordance with the invention to convert molybdenum values contained therein to $CaMoO_4$ which is precipitated from solution and recovered. The resulting aqueous solution greatly reduced in contained molybdenum can then be conveniently disposed of with minimum further treatment.

In place of incineration, other procedures such as wet air oxidation or biotreatment may be used to remove organic materials before conversion of molybdenum values to $CaMoO_4$ in accordance with the invention. In such cases, acidification as above described to separate $CO_2$ is not necessary. Incineration does, however, represent the preferred method for separating the organic materials.

BRIEF DESCRIPTION OF THE DRAWING

The attached drawing illustrates in schematic form a practice of the invention.

DETAILED DESCRIPTION

In accordance with the present invention, an aqueous epoxidation stream containing molybdenum catalyst values, sodium values from caustic treatment and organic materials is incinerated in accordance with known procedures. Essentially complete combustion of organics is achieved. The molybdenum and sodium values are recovered as an aqueous incinerator blowdown stream.

The molybdenum and sodium containing blowdown stream is then acidified to a pH of below 5 and with appropriate agitation the carbonates are converted to $CO_2$ which is vaporized and separated. The sodium is converted to the sodium salt of the added acid. Temperatures of 25° C. to boiling can be employed to accomplish $CO_2$ removal. The higher temperatures are preferred so as to minimize the residual dissolved $CO_2$. Sparging or boiling procedures can be employed if desired or suitable. Carbonate conversion and $CO_2$ removal by means of acidification and stripping is important in that in subsequent treatment to form $CaMoO_4$, $CaCO_3$ is formed by reaction with residual carbonate resulting in increased consumption of the calcium values.

The acidified blowdown solution after $CO_2$ removal or the equivalent aqueous molybdenum containing stream where other organics removal procedures are used is then treated to convert contained molybdenum values to insoluble $CaMoO_4$ which can be recovered by filtration. In this step, there are a number of critical features. The pH of the solution is adjusted by addition of aqueous NaOH to values in the range 6–9, preferably 7–8. Calcium values are added generally in the form of the salt of the acid used in the acidification, e.g. $CaCl_2$ where HCl is used for acidification, although CaOH or CaO can also be used.

The amount of calcium added must be at least 1/1, Ca/Mo in order to achieve satisfactory conversion of the molybdenum values to $CaMoO_4$. The greater the ratio of Ca/Mo, the greater is the conversion to $CaMoO_4$ and consequently the greater is the percentage removal of molybdenum. Preferably Ca/Mo ratios of 2/1 to 100/1 are employed, preferably 3/1 to 10/1. Higher Ca/Mo ratios are needed if competing contaminates such as carbonates or sulfates are present.

Temperature is likewise an important consideration. In order for ready conversion of molybdenum values to $CaMoO_4$ to proceed, temperatures of about 80° C. up to the boiling point of the solution are employed. At temperatures of 80° C. or higher, solid $CaMoO_4$ is formed in a matter of minutes, 15 minutes to several hours generally being satisfactory.

The pH of the solution is likewise an important variable. For proper precipitation of $CaMoO_4$ to take place, the solution pH must be in the range of 6–9. There seems to be no apparent optimum pH in this range.

In accordance with the invention the formed $CaMoO_4$ is a fine particulate which readily settles out of solution. Solids can be separated by decantation or filtration or a combination of these procedures. Proper selection of conditions results in greater than 95% removal of molybdenum from the aqueous solution.

For a further description of the invention, reference is made to the accompanying drawing. Aqueous incinerator blowdown is introduced into zone 1 via line 2 together with sufficient HCl introduced via line 3 to lower the pH of the resulting solution to about 5. The temperature of the solution in zone 1 can be maintained above 80° C. and the carbon dioxide formed as a result of acidification of the carbonate values in the incinerator blowdown is removed via line 4. A stripping gas such as nitrogen (not shown) can be introduced into zone 1 to aid in $CO_2$ removal.

The substantially carbonate-free solution is passed via line 5 from zone 1 to filter 6 wherein a small amount of solids formed in zone 1 are filtered from the solution and removed via line 7. These solids are comprised of compounds of Mo, Fe and Na and, if not removed, may interfere with subsequent $CaMoO_4$ formation and precipitation.

From filter 6 the solution passes via line 8 to zone 9. Aqueous caustic is added to the feed to zone 9 via line 10 in amount sufficient to increase the resulting solution pH to 6–9. Also added to the feed to zone 9 via line 11 is an aqueous $CaCl_2$ stream in amount sufficient to provide at least a 1/1 stoichiometric ratio of Ca/Mo and preferably at least a 2/1 stoichiometric ratio of Ca/Mo in zone 9.

In zone 9 solution temperature is maintained in the range of about 88° C. to the boiling point with a residence time of 15 minutes or more whereby $CaMoO_4$ is formed as a solid insoluble precipitate. Appropriate mixing is provided in zone 9 by conventional means.

The solids-containing solution passes from zone 9 via line 12 to filter 13 where the solid precipitate is separated via line 14 to $CaMoO_4$ recovery. The solution which has a greatly reduced molybdenum values content is recovered via line 15.

The items shown in the drawing can represent either:

1) a continuous operation scheme where each zone is a unit operation; or 2) a batch operation scheme where zones 1 and 9 represent steps in the batch sequence.

Both continuous and batch operation of this technology is feasible.

EXAMPLE

Referring to the attached drawing, a molybdenum containing stream from a propylene oxide and styrene monomer process is incinerated in accordance with conventional procedures and a blowdown stream comprised of molybdenum and sodium carbonates is recovered. The blowdown stream containing by weight 7% sodium carbonate, 5% sodium bicarbonate, 1100 pm Mo, 1100 ppm S, and 100 ppm Fe is fed at the rate of 18000 lbs per hour to zone 1 via line 2. Also fed to zone 1 via line 3 is an aqueous hydrochloric acid stream comprised of 37% HCl by weight at the rate of 3580 lbs per hour to adjust the pH of the resulting mixture to about 5. In zone 1 the solution is maintained at 85° C. and formed $CO_2$ is removed via line 4 at the rate of 1075 lbs per hour.

The substantially carbonate-free solution is passed from zone 1 via line 5 to filter 6 wherein 100 ppm of solids is separated via line 7. These solids comprise mainly Mo, Fe, and Na values.

The filtrate from filter 6 passes via line 8 to zone 9 in admixture with 10 lbs per hour of aqueous caustic (50% by weight NaOH) and 305 lbs per hour of aqueous $CaCl_2$ (45 wt% $CaCl_2$) introduced via line 11. The mixture in zone 9 is thoroughly mixed and is maintained at 90° C. with a residence time of 30 minutes. In zone 9 a reaction occurs between the molybdenum values in the feed solution and the introduced calcium compound whereby calcium molybdate is formed and precipitated. The mixture from zone 9 passes via line 12 to filter 13 wherein the calcium molybdenum is filtered from the solution and removed via line 14 at the rate of 80 lbs per hour. The filtrate is recovered via line 15 at the rate of 20750 lbs per hour and contains 25 ppm of molybdenum. The stream is suitable for discharge without substantial further treatment.

I claim:

1. The process for separating molybdenum epoxidation catalyst values from a molybdenum and sodium containing epoxidation process stream which comprises incinerating said stream, separating an aqueous blowdown stream from the incineration containing the molybdenum and sodium values as sodium molybdate and sodium carbonate, acidifying the separated aqueous stream by addition of acid to convert the sodium carbonate to $CO_2$ and the sodium salt of the added acid, separating formed $CO_2$, reacting the remaining solution with a calcium compound at a temperature range of 80° C. to the boiling point of the solution and at a pH of 6–9, the ratio of added Ca to Mo in the solution being at least 1/1 and separating formed $CaMoO_4$ solid.

2. The process of claim 1 wherein the ratio of added Ca to Mo is 2/1 to 100/1.

3. The process of claim 1 wherein said separated aqueous stream is acidified to a pH of below 5.

4. The process of claim 1 wherein said separated aqueous stream is acidified with HCl.

5. The process of claim 1 wherein said pH is 7–8.

* * * * *